(12) United States Patent
Susai et al.

(10) Patent No.: US 6,954,780 B2
(45) Date of Patent: *Oct. 11, 2005

(54) INTERNET CLIENT-SERVER MULTIPLEXER

(75) Inventors: Michel K. Susai, San Jose, CA (US);
Rajiv Sinha, San Jose, CA (US);
Deepinder S. Setia, San Jose, CA (US);
Ajay V. Soni, Sunnyvale, CA (US)

(73) Assignee: NetScaler, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/163,342

(22) Filed: Jun. 7, 2002

(65) Prior Publication Data

US 2002/0147822 A1 Oct. 10, 2002

Related U.S. Application Data

(62) Division of application No. 09/188,709, filed on Nov. 10, 1998, now Pat. No. 6,411,986.

(51) Int. Cl.[7] .............................................. G60F 15/16
(52) U.S. Cl. ..................... 709/203; 709/201; 709/223; 709/226; 709/227; 370/431
(58) Field of Search ................................ 709/201, 203, 709/223–227, 229, 217, 245; 370/431; 711/124

(56) References Cited

U.S. PATENT DOCUMENTS

| 5,774,670 A | 6/1998 | Montulli ..................... 709/227 |
| 5,787,470 A | 7/1998 | DeSimone et al. ......... 711/124 |
| 5,852,717 A | 12/1998 | Bhide et al. ............ 395/200.33 |
| 5,918,013 A | 6/1999 | Mighdoll et al. ....... 395/200.47 |
| 5,941,988 A | 8/1999 | Bhagwat et al. ............. 713/201 |
| 6,173,322 B1 | 1/2001 | Hu .............................. 709/224 |
| 6,182,139 B1 * | 1/2001 | Brendel ...................... 709/226 |

OTHER PUBLICATIONS

Zheng Wang et al., "Prefetching in World Wide Web," Department of Computer Science, University College London, United Kingdom, Nov. 18–22, 1996, pp. 28–32.

Mogul, J.C., "The Case for Persistent–Connection HTTP," Computer Communication Review Conference, Aug. 1995, vol. 25, No. 4, pp. 299–313.

Egevang, K. et al., "The IP Network Address Translator (NAT)", Request For Comments No. 1631, May 1994, as printed Aug. 11, 1998 from http://www.safety.net/rfc1631.txt, 9 pages.

* cited by examiner

*Primary Examiner*—Jason R. Cardone
*Assistant Examiner*—Hieu Le
(74) *Attorney, Agent, or Firm*—Sterne, Kessler, Goldstein & Fox PLLC

(57) ABSTRACT

An apparatus, method and computer program product for network client-server multiplexing. The apparatus is implemented within an interface unit connecting a plurality of servers to the Internet, which is connected to a plurality of clients. According to a "connection pooling" aspect of the invention, the interface unit opens and maintains connections with the servers and handles the opening and closing of connections with clients accessing the servers, thereby freeing the servers of the processing load incurred by opening and closing connections. According to a "connection distribution" aspect of the invention, the interface unit examines the path names within requests received from clients and selects the server hosting the requested information according to the path names.

18 Claims, 11 Drawing Sheets

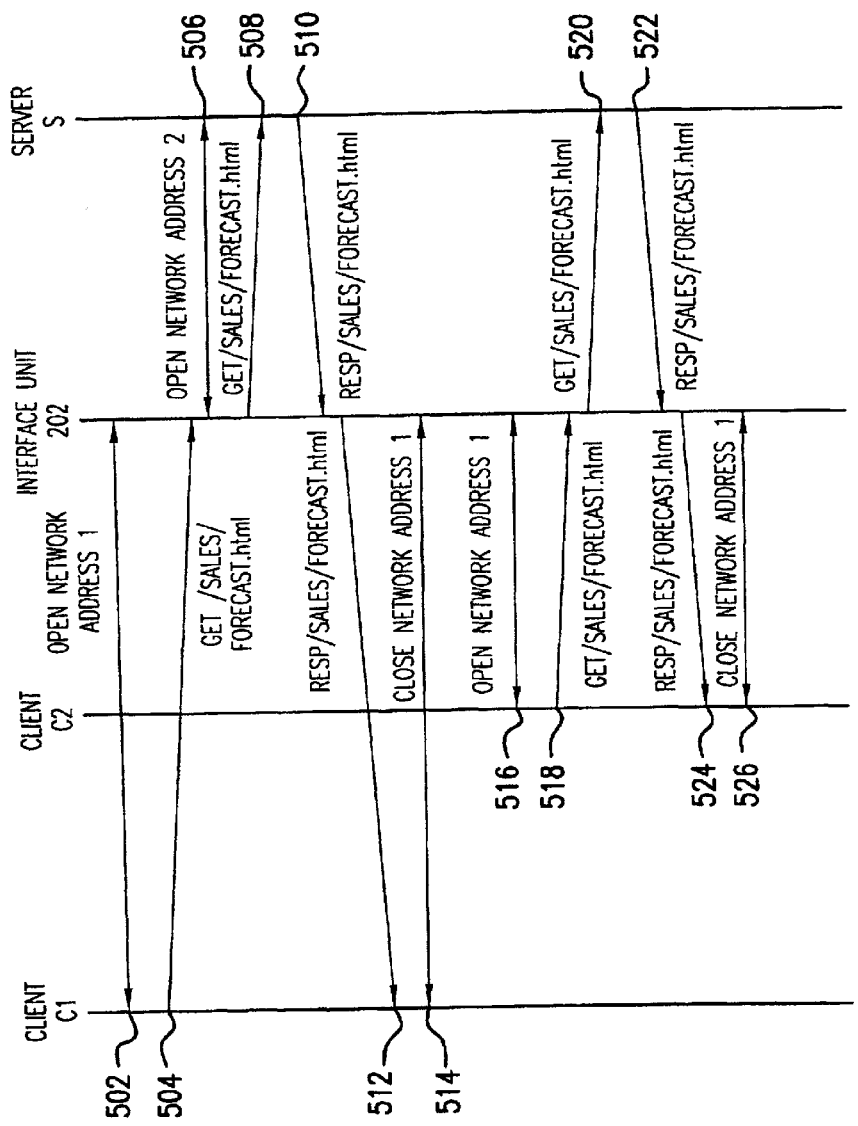

INTERNET CLIENT-SERVER MULTIPLEXER

CROSS REFERENCE TO RELATED APPLICATION:

This application is a divisional of application Ser. No. 09/188,709, filed Nov. 10, 1998 now U.S. Pat. No. 6,411,986.

BACKGROUND OF THE INVENTION

1. Field of the Invention

The present invention relates generally to Internet client-server applications, and more specifically to multiplexing connections between clients and servers over the Internet.

2. Related Art

The importance to the modern economy of rapid information and data exchange cannot be understated. This explains the exponentially increasing popularity of the Internet. The Internet is a world-wide set of interconnected computer networks that can be used to access a growing amount and variety of information electronically.

One method of accessing information on the Internet is known as the World Wide Web (www, or the "web"). The web is a distributed, hypermedia system, and functions as a client-server based information presentation system. Information that is intended to be accessible over the web is stored in the form of "pages" on general-purpose computers known as "servers." Computer users can access a web page using general-purpose computers, referred to as "clients," by specifying the uniform resource locator (URL) of the page. FIG. 1 is a network block diagram showing a plurality of clients and servers connected to the Internet.

When a client specifies a URL, a part of the URL known as the Domain Name is passed to a domain server (DNS) to be translated to a network address. The network address specifies the Internet protocol (IP) address of the intended server. The client request is passed to the server having the network address. The server uses the path name in the URL to locate the web page requested by the client. A copy of the web page is then sent to the client for viewing by the user.

The client-server paradigm described above has served the Internet well. However, there are some problems. One problem is server connection loading.

Servers are designed to do certain things well. Servers are typically general-purpose machines that are optimized for general tasks such as file management, application processing, database processing, and the like. Servers are not optimized to handle switching tasks such as opening and closing network connections. Under certain load conditions, these tasks can represent a considerable overhead, consuming a large percentage of the server's processing resources, often on the order of twenty percent and sometimes up to fifty percent. This problem is referred to herein as "connection loading."

To further explain loading, the client and server must typically exchange three packets of information to setup a connection. Once the connection is established a client sends a URL (page) request to the server, this consists of one packet. The server will then send one or more packet responses back to the client. Once a request and response is exchanged from the client and server, both client and server will close their respective connections. The closing of the connection takes an additional four packets of information exchange. As demonstrated above, there is a significant amount of overhead (i.e., seven packets) involved to download one URL. A page typically consists of multiple URL's.

Additional problems associated with connection loading include:

Each packet that reaches the server interrupts the server's CPU to move that packet from the Network Interface Card (NIC) into the server's main memory. This results in loss of productivity on the server's CPU. Thus what is needed is a way to avoid wasting valuable CPU time at the server side. As a consequence, the same resource can be applied to process more URL (page) requests. This will thus improve the servers URL processing capacity.

As discussed above, it takes three packets for connection establishment. Furthermore, connection establishment uses up significant server resources related to the CPU/memory. To establish a connection at the server side, the packet needs to be processed by the driver layer, where Ethernet specific information is handled. The driver layer sends the packet to the IP layer for more processing, where all the IP (Internet Protocol) related processing is handled. After this, the packet is passed to TCP (Transmission Control Protocol) layer, where the TCP related information is processed. The TCP layer consumes significant server resources to create a connection table, etc. Thus, what is needed is a way of avoiding connection processing to thereby save significant CPU/memory resources.

The Web server needs to create a thread for each incoming connection to be processed. After the connection and URL request are processed, the thread will be closed. A thread is a Light Weight Process (LWP) that is a type of process. Even though threads are efficient it takes significant CPU and memory resources to create and destroy the threads. Thus, by avoiding thread creation, a significant amount of server resources can be preserved, which in turn can be used to process more web requests.

Servers with more than one CPU are called SMP (Symmetric Multi Processing) systems, these systems have a common memory architecture. The SMP systems also have a single Operating System (OS) managing the multiple CPUs. Single OS implies single Networking/Protocol stack. When multiple CPUs access data structures in the kernel protocol stack, it is important to protect against the data corruption, since more than one CPU can read/write on that data structure. The protection code imposes additional per-packet overhead on SMP systems.

Finally, the throughput of an individual server is limited. Therefore, data providers wishing to serve a high volume of Internet requests frequently resort to an approach of replicating the content on multiple servers and then distributing the requests between these servers. This approach requires content to be replicated in its entirety to each one of the replica servers, even the content which is infrequently accessed. This represents a waste of server resources.

SUMMARY OF THE INVENTION

The present invention is a system, method and computer program product for network client-server multiplexing. In a preferred embodiment, the present invention is implemented within an interface unit connecting a plurality of servers to the Internet, which is in turn connected to a plurality of clients.

According to one aspect of the invention, the method includes the steps of opening a connection between a client and the interface unit; opening a connection between the interface unit and a server if no free connection is open between the interface unit and the server; allowing the client to access information on the server via the connections; and closing the connection between the client and the interface unit while keeping open the connection between the interface unit and the server.

According to another aspect of the invention, the method includes the steps of receiving from a client a request to retrieve data using a network address and a path name; selecting a server storing the data as a function of predefined policies including at least one of the path name, the load of the server, and the state of the server; retrieving the data from the server using a previously-opened connection; and sending the data to the client.

One advantage of the present invention is that it resolves the connection loading problem through a technique referred to herein as "connection pooling."

Another advantage of the present invention is that it resolves the content replication problem through use of a technique referred to herein as "connection distribution."

Yet another advantage of the present invention is that it transparently splices connections from servers and clients using a technique referred to herein as "connection multiplexing."

BRIEF DESCRIPTION OF THE FIGURES

The features and advantages of the present invention will become more apparent from the detailed description set forth below when taken in conjunction with the drawings in which like reference characters identify corresponding elements throughout and wherein:

FIG. 5 is a message flow diagram illustrating the connection pooling aspect of the present invention according to a preferred embodiment;

DETAILED DESCRIPTION OF THE PREFERRED EMBODIMENTS

The present invention is a system, method and computer program product for network client-server multiplexing.

Figure 1:
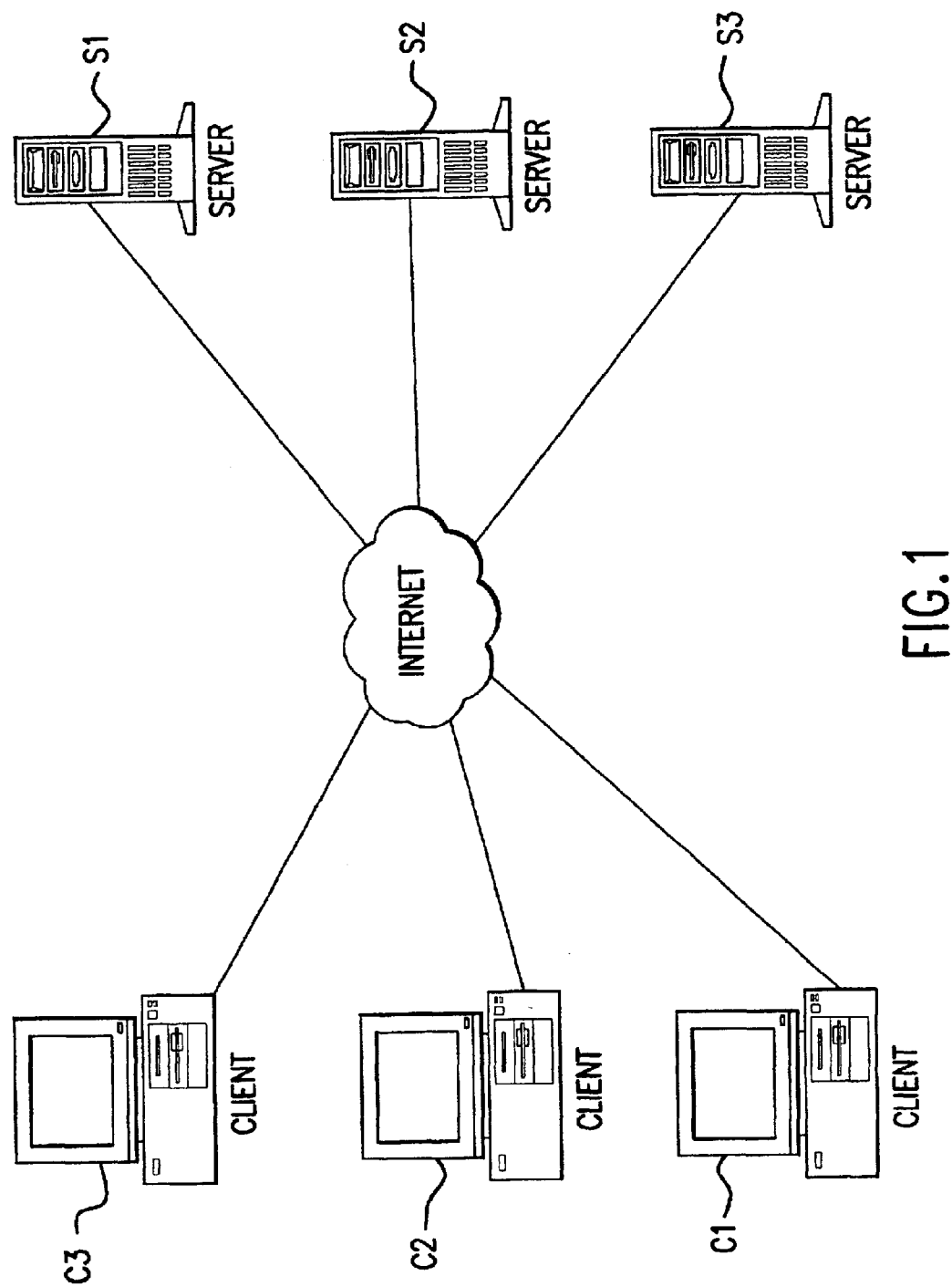
FIG. 1 is a network block diagram showing a plurality of clients and servers connected to the Internet.
Figure 2:
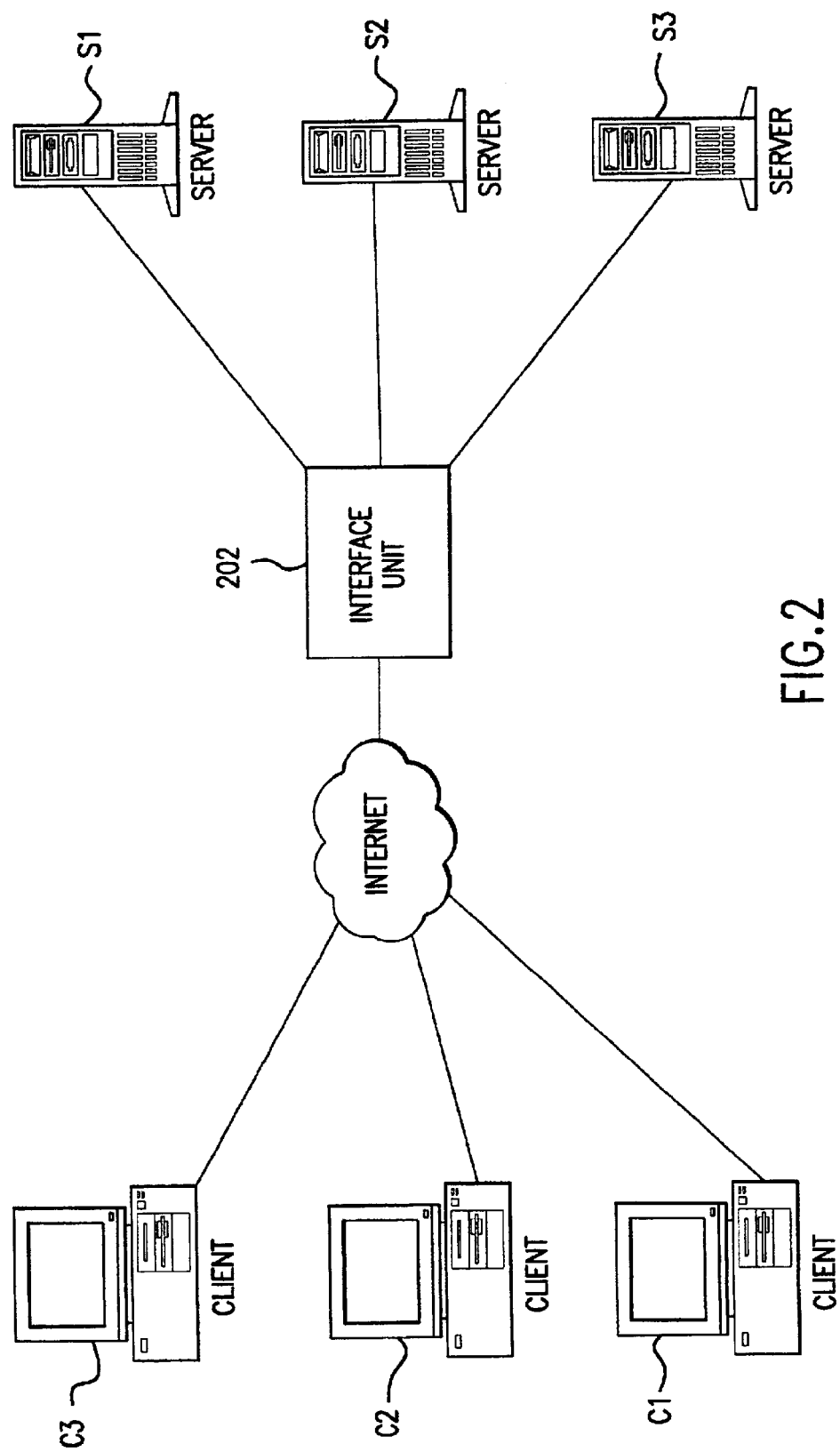
FIG. 2 is a network context diagram for an interface unit according to a preferred embodiment of the present invention.

FIG. 2 is a network context diagram for interface unit 202 according to a preferred embodiment of the present invention. In a preferred embodiment, an interface unit is an intelligent network interface card with a CPU inside a server. An interface unit can also be an intelligent box sitting outside the server, in which case it can serve more than one server. The interface unit 202 can also be a load balancer, bandwidth manager, firewall, router, switch, computer system, or any other network device that is located between a client and server.

Referring to FIG. 2, a plurality of clients C1, C2, C3 are coupled to the Internet and a plurality of servers S1, S2, S3, are coupled to the Internet by interface unit 202. Servers S1, S2, S3 are collectively referred to as a "server farm." All Internet traffic with the server farm passes through interface unit 202. While the present invention is described in terms of the Internet, the concepts described also apply to other types of networks, as will be apparent to one skilled in the relevant art.

According to one aspect of the present invention, interface unit 202 relieves servers S1, S2, S3 of much of the processing load caused by repeatedly opening and closing connections to clients by opening one or more connections with each server and maintaining these connections to allow repeated data accesses by clients via the Internet. This technique is referred to herein as "connection pooling."

Figure 3:
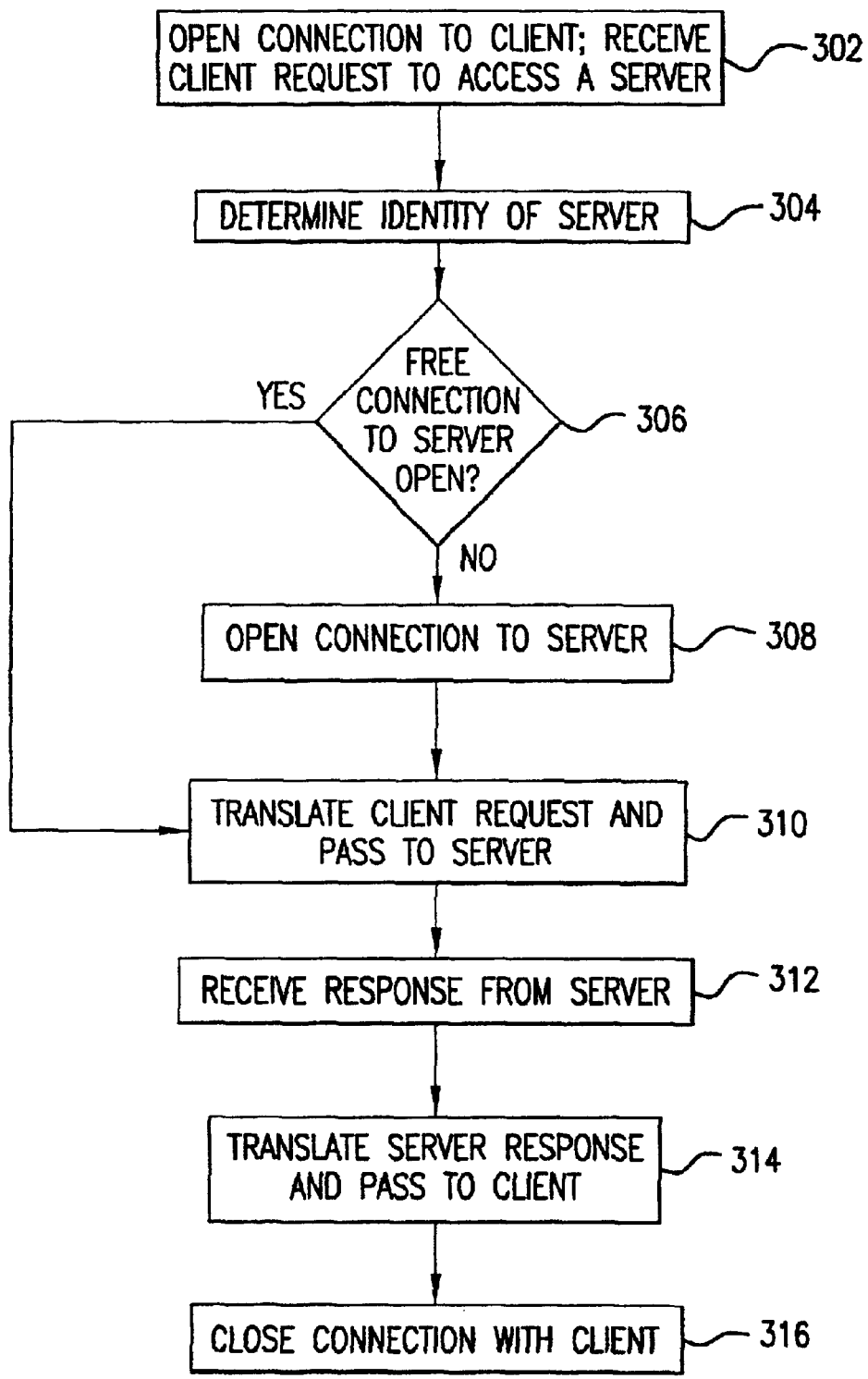
FIG. 3 is a flowchart illustrating the operation of the connection pooling aspect of the present invention according to a preferred embodiment.

FIG. 3 is a flowchart illustrating the operation of the connection pooling aspect of the present invention according to a preferred embodiment. The process begins when a client requests access to one of the servers in the server farm tended by interface unit 202. A connection is opened between the interface unit and the requesting client, and interface unit 202 receives the client request to access the server, as shown in step 302. Interface unit 202 determines the identity of the requested server as shown in step 304. In one embodiment, this is accomplished by examining the destination network address specified by the client request. In another embodiment, this is accomplished by examining the network address and path name specified by the client request. After determining the identity of the server to which the client request should be directed, interface unit 202 determines whether a free connection (that is, one that is not in use) to the server is already open, as shown in step 306. If so, processing resumes at step 310. If not, interface unit 202 opens a connection to the server, as shown in step 308. Interface unit 202 then translates the client request and passes it to the server, as shown in step 310, and as more fully described with respect to FIG. 4, below. After server processing, the interface unit receives a response from the server, as shown in step 312. The server response is translated and passed to the requesting client, as shown in step 314 and described further below. Finally, interface unit 202 closes the connection with the client as shown in step 316. However, the connection between the interface unit 202 and server is not disconnected. By maintaining open connections with the servers and by opening and closing connections with the client as needed, interface unit 202 frees the servers of nearly all of the connection loading problems associated with serving clients over the Internet.

Figure 4:
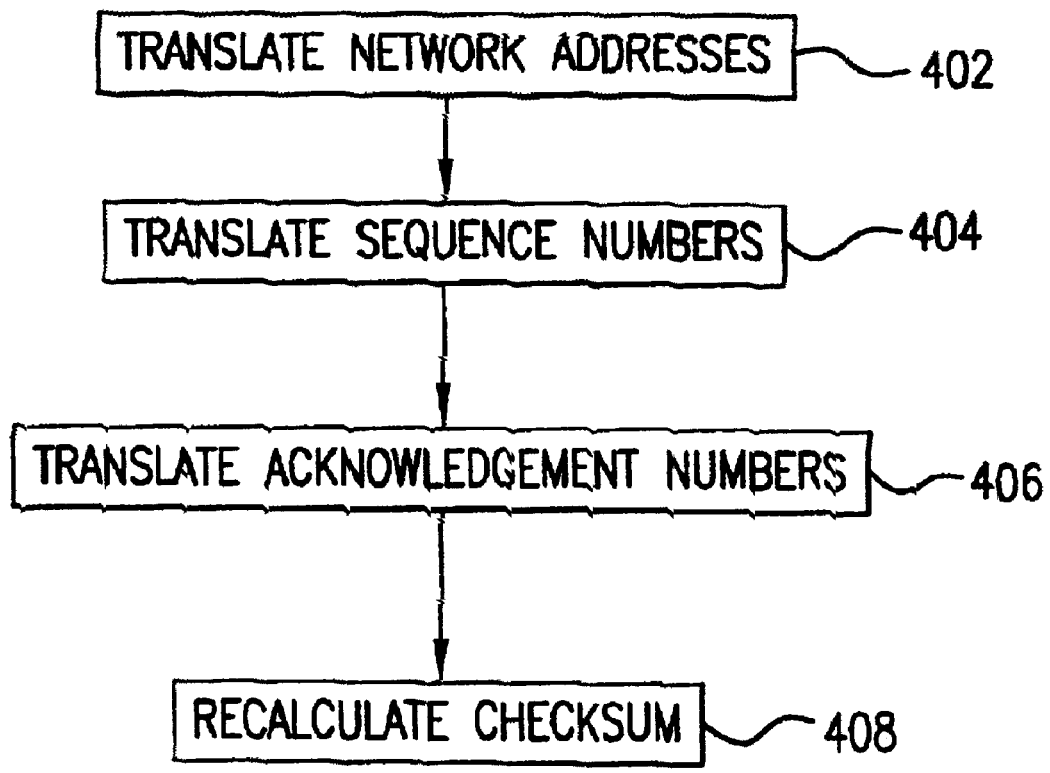
FIG. 4 is a flowchart depicting the operation of the present invention in translating client and server requests to achieve connection multiplexing.

FIG. 4 is a flowchart depicting the operation of the present invention in translating client and server requests to achieve connection multiplexing, as shown in steps 310 and 314. In a preferred embodiment, the message traffic is in the form of TCP/IP packets, a protocol suite that is well-known in the art. The TCP/IP protocol suite supports many applications, such as Telnet, File Transfer Protocol (FTP), e-mail, and Hyper-Text Transfer Protocol (HTTP). The present invention is described in terms of the HTTP protocol. However, the concepts of the present invention apply equally well to other TCP/IP applications, as will be apparent to one skilled in the art after reading this specification.

Each TCP packet includes a TCP header and an IP header. The IP header includes a 32-bit source IP address and a 32-bit destination IP address. The TCP header includes a 16-bit source port number and a 16-bit destination port number. The source IP address and port number, collectively referred to as the source network address, uniquely identify the source interface of the packet. Likewise, the destination IP address and port number, collectively referred to as the destination network address, uniquely identify the destination interface for the packet. The source and destination network addresses of the packet uniquely identify a connection. The TCP header also includes a 32-bit sequence number and a 32-bit acknowledgment number.

The TCP portion of the packet is referred to as a segment. A segment includes a TCP header and data. The sequence number identifies the byte in the string of data from the sending TCP to the receiving TCP that the first byte of data in the segment represents. Since every byte that is exchanged is numbered, the acknowledgment number contains the next sequence number that the sender of the acknowledgment expects to receive. This is therefore the sequence number plus one of the last successfully received byte of data. The checksum covers the TCP segment, i.e., the TCP header and the TCP data. This is a mandatory field that must be calculated and stored by the sender, and then verified by the receiver.

In order to successfully route an inbound packet from a client to the intended server, or to route an outbound packet from a server to a client, interface unit 202 employs a process known as "network address translation." Network address translation is well-known in the art, and is specified by request for comments (RFC) 1631, which can be found at the URL http://www.safety.net/RFC1631.txt.

However, in order to seamlessly splice the client and server connections, the present invention also employs a novel translation technique, referred to herein as "connection multiplexing." According to this technique, the present invention translates a packet by modifying its sequence number and acknowledgment number at the TCP protocol level. A significant advantage of this technique is that no application layer interaction is required.

Referring to FIG. 4, the network address of the packet is translated, as shown in step 402. In the case of an in-bound packet (that is, a packet received from a client), the source network address of the packet is changed to that of an output port of the interface unit, and the destination network address is changed to that of the intended server. In the case of an outbound packet (that is, one received from a server), the source network address is changed from that of the server to that of an output port of the interface unit, and the destination address is changed from that of the interface unit to that of the requesting client. The sequence numbers and acknowledgment numbers of the packet are also translated, as shown in steps 404 and 406 and described in detail below. Finally, the packet checksum is recalculated to account for these translations, as shown in step 408.

FIG. 5 is a message flow diagram illustrating the connection pooling aspect of the present invention according to a preferred embodiment. FIG. 5 shows interface unit 202 connecting two clients, C1 and C2, to a server S. First, interface unit 202 opens a connection with client C1 using network address 1 provided by client C1 as shown by flow 502. Flow line 502 is shown as a two-way flow because the TCP/IP protocol employs a multi-stage handshake to open connections.

Once the connection is opened, interface unit 202 receives a GET request from client C1 specifying a path name of /sales/forecast.html, as shown by flow line 504. Because no free connection is open between interface unit 202 and server S, interface unit 202 opens a connection with server S. Interface unit 202 maps this request to network address 2, which specifies server S, as shown by flow line 506. Interface unit 202 also passes the GET request to that server, as shown by flow line 508. Server S responds with the requested web page, as shown by flow line 510. Interface unit 202 forwards the web page to client C1, as shown by flow line 512. Finally, the connection between client C1 and interface unit 202 is closed, as shown by flow line 514. According to the TCP/IP protocol, closing a network connection can involve a multi-stage process. Therefore, flow line 514 is shown as bidirectional. It is important to note that interface unit 202 does not close the connection with server S, but rather keeps it open to accommodate further data flows.

Next, a connection is opened between interface unit 202 and client C2 using network address 1 provided by client C2, as shown by flow line 516. Next, interface unit 202 receives a GET request from client C2 specifying the Web page/sales/forecast.html, as shown by flow line 518. Because a free connection is already open between interface unit 202 and server S, it is unnecessary for interface unit 202 to burden server S with the processing load of opening a further connection. Interface unit 202 merely uses a free open connection. Interface unit 202 maps the GET request to server S, transfers it, and forwards it to server S, as shown by flow line 520. Interface unit 202 receives the response from server S, as shown by flow line 522, and forwards it to client C2 as shown by flow line 524. Finally, interface unit 202 closes the connection with client C2, as shown in flow line 526. Once again, interface unit 202 does not close the connection with server S. Instead, interface unit 202 keeps the connection open to accommodate further data flows.

There are a number of scenarios that result in interface unit 202 closing the connection with client C2, as shown in flow line 524. For example, the client may initiate a FIN (finish) command, which occurs once the client has retrieved all requested data. The client may also initiate a RST (reset) command. In addition to closing the connection between the interface unit 202 and the client, the RST command results in a number of housekeeping operations being performed to keep the server side connection in good order. In particular, the TCP protocol guarantees that the RST command will have the right SEQ (sequence) number so that the server will accept the segment; however, the RST command is not guaranteed to have the right ACK (acknowledge) number. To take care of this scenario, the interface unit 202 keeps track of the bytes of data sent by the server and the bytes acknowledged by the client. If the client has not yet acknowledged all the data by the server, the interface unit 202 calculates the unacknowledged bytes, and sends an ACK to the server. Furthermore, the server side PCB may be placed on a timeout queue to allow any pending server data transfers to drain.

Furthermore, although not shown in FIG. 5, the server can also close a connection between itself and the interface unit 202. The server would send a FIN command to the interface unit 202. In this case, both the connection between the server and interface unit 202 and the connection between the interface unit 202 and client will be closed.

Another aspect of the invention is to maximize offload of connection processing from the server by minimizing the occasions on which the server closes the connection. There are three cases:

(1) The protocol version HTTP/1.1 is used. In this case, no explicit Keep-Alive header is required. By default, the server keeps the connection open; it is up to the client to close the connection. The present invention offloads the server by reusing the server side connection.

(2) The protocol version HTTP/1.0 is used and the "Connection: Keep-Alive" header is provided by the client. In this case, the server keeps the connection open; it is up to the client to close the connection. The present invention offloads the server by reusing the server side connection.

(3) The protocol version HTTP/1.0 is used and the "Connection: Keep-Alive" header is not provided by the client. In this case, the server will normally (without the present invention) close the connection after fully satisfying one GET request. If the server closes the connection after each request this denies that interface unit 202 the opportunity to reuse the server side connection. As it turns out much of the Internet still uses HTTP/1.0 without "Connection: Keep Alive." Hence, the present invention allows reuse of server side connections in this specific, and important case. The interface unit 202 inspects the GET packet to detect this situation. When this case is detected, the interface unit 202 inserts "Connection: Keep-Alive" into the GET packet. Since this is done invisibly to the client, the interface unit 202 must keep track of the number of "Bytes Added" on the server side connection. The "Bytes Added" does not affect the Sequence numbers in the GET packet since the sequence number is that of the first byte. However, the interface unit 202 must add "Bytes Added" to the sequence number of subsequent packets from the client to the server. Conversely, the server will acknowledge the additional bytes, but the interface unit must subtract them before sending the acknowledgment to the client—which does not know that these bytes were added.

As mentioned above, connection multiplexing is achieved by manipulating sequence and acknowledgment numbers. Sequence and acknowledgment numbers of segments received by interface unit 202 are modified and mapped to values expected by te recipient. To the client, data appears to be coming from the server and vice versa. For example if "Inflow" denotes a segment received by interface unit 202 and "Outflow" denotes the corresponding outbound segment, the sequence and acknowledge numbers are changed in the following manner:

Outflow sequence number=Inflow sequence number−Inflow starting sequence number+Outflow starting sequence number Outflow acknowledge number=Inflow acknowledge number−Inflow starting acknowledge number+Outflow starting acknowledge number To address the addition of the "Connection: Keep Alive" header for HTTP/1.0 packets, the interface unit 202 keeps track of "Bytes Added" on the appropriate half of the connection—in this case the server side. The sequence number and acknowledgment number formulas are changed as follows:

Outflow sequence number=Inflow sequence number−Inflow starting sequence number+Outflow starting sequence number+Outflow Bytes Added Outflow acknowledge number=Inflow acknowledge number−Inflow starting acknowledge number+Outflow starting acknowledge number−Inflow Bytes Added Specific examples of translations accomplished using these equations are given below.

Figure 6A:
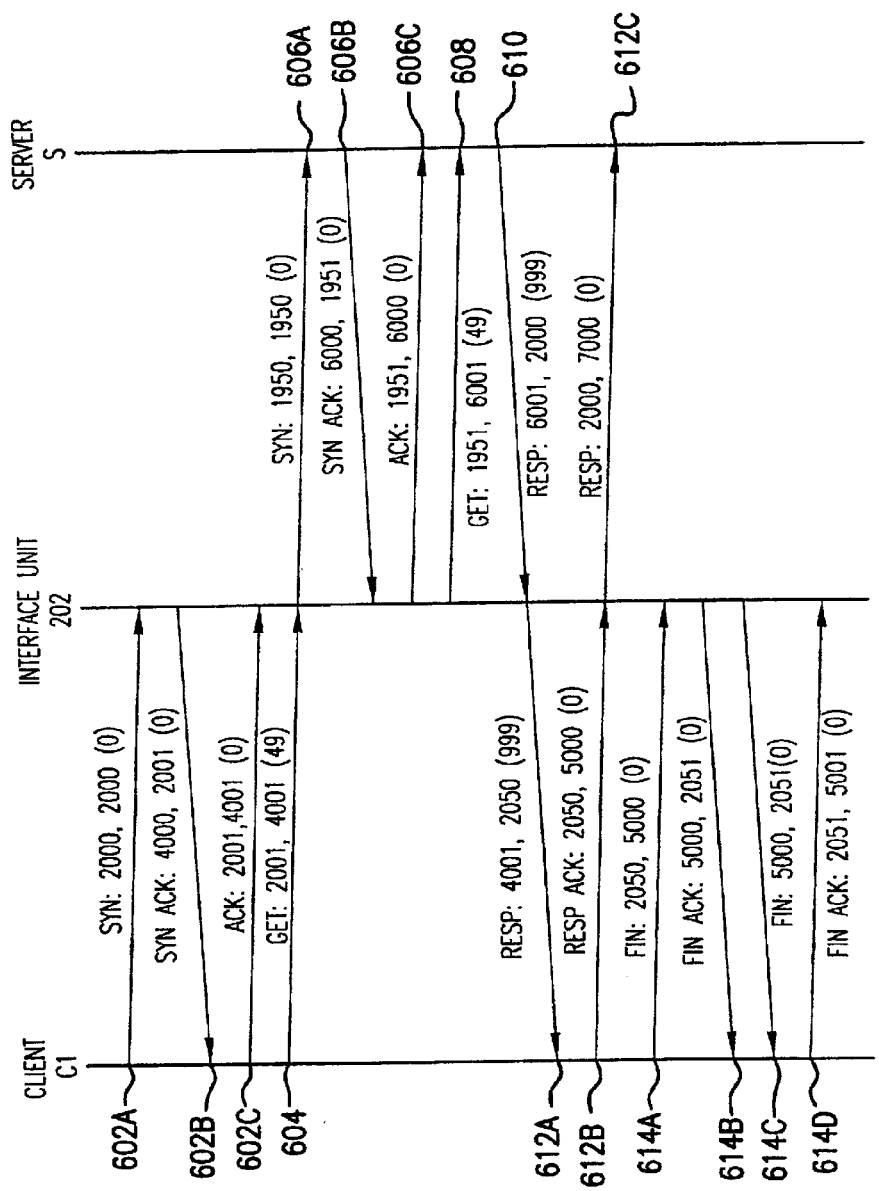
FIGS. 6A and 6B are detailed flow diagrams illustrating the translations of acknowledgment and sequence numbers performed by the present invention in the example of FIG. 5 according to a preferred embodiment.
Figure 6B:
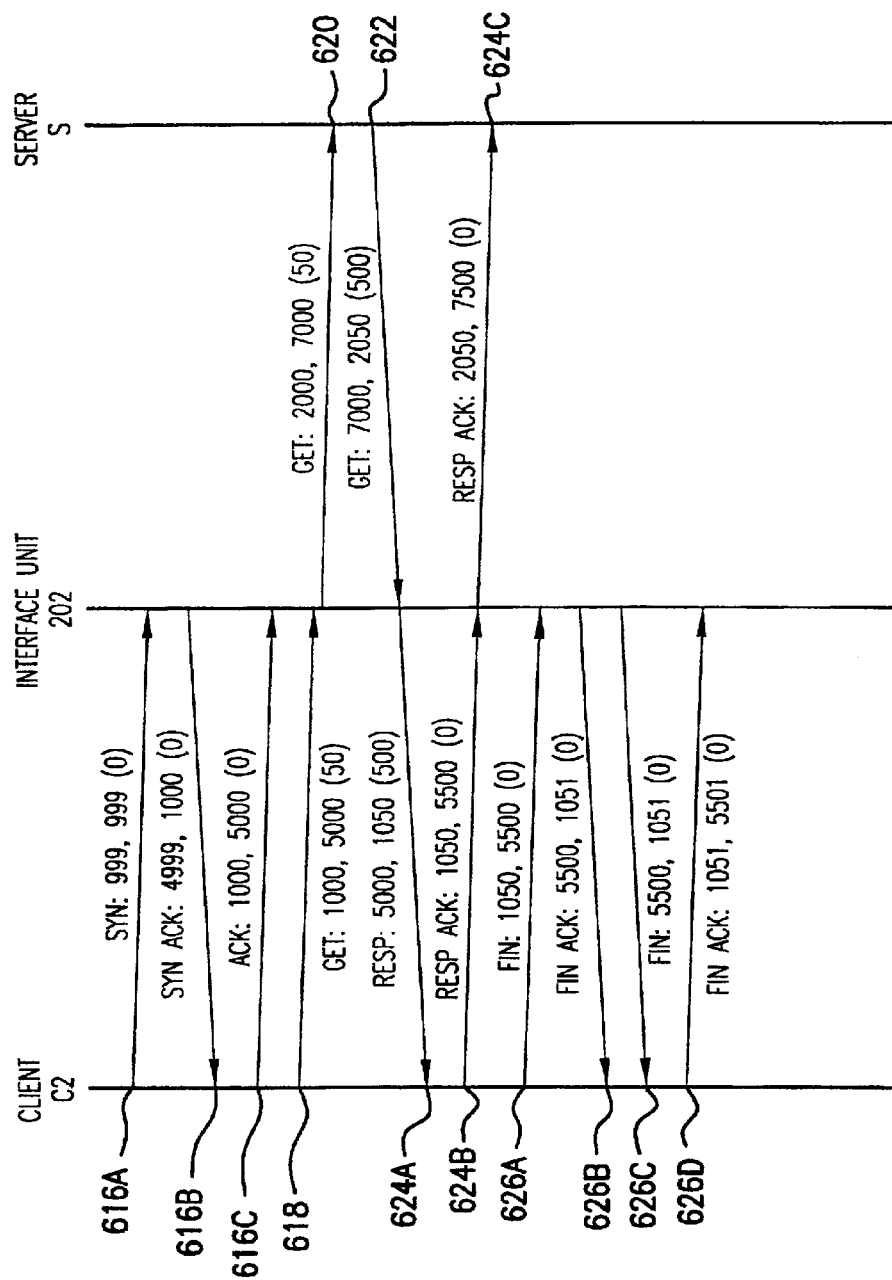

FIGS. 6A and 6B are detailed flow diagrams illustrating the translations of acknowledgment and sequence numbers performed by the present invention in the example of FIG. 5 according to a preferred embodiment. The label for each flow in FIGS. 6A and 6B is of the form T:S,A(L), where T represents a TCP segment type, S is the sequence number, A is the acknowledgment number, and L is the length parameter. The length parameter describes the number of bytes of data in the TCP segment. The flows of FIG. 6A correspond to flows 502 through 514 of FIG. 5.

Flows 602A, B, C correspond to flow 502, and present one method of opening the connection between client C1 and the interface unit 202. Each flow represents a TCP segment. In TCP segment 602A, the SYN flag in the TCP header is set, indicating a new connection request from client C1. Client C1 has established a starting sequence number of 2000 and an acknowledgment number of 2000. Interface unit 202 responds with a SYN ACK segment specifying a starting sequence number of 4000, and incrementing the acknowledgment number to 2001, as shown by flow 602B. Each entity (e.g., client, server, interface unit) within the network sets its own unique sequence number and/or acknowledgment number, as is well known in the art. Client C1 responds with an ACK segment specifying a sequence number of 2001 and incrementing the acknowledgment number to 4001, as shown by flow 602C. Client C1 then sends a GET segment specifying a length of 49 bytes, as shown by flow 604.

Interface unit 202 determines that no free open connections exist with server S and therefore sends a SYN segment to server S, specifying a starting sequence number of 1950, as shown in flow 606A. Server S responds with a SYN ACK segment specifying a starting sequence number of 6000 and incrementing the acknowledgment number to 1951, as shown in 606B. Interface unit 202 responds with an ACK segment, as shown by flow 606C. Interface unit 202 then forwards the GET segment from client C1 to server S, after modifying the sequence and acknowledgment numbers according to the translation equations described above, as shown by flow line 608.

Server S responds with the requested data specifying a sequence number of 6001, an acknowledgment number of 2000, and a length of 999, as shown by flow 610. Interface unit 202 receives the RESP segment, translates the sequence and acknowledgment numbers, and forwards the RESP segment to client C1, as shown by flow line 612A. Client C1 responds with a RESP ACK segment, as shown by flow 612B. Interface unit 202 modifies the acknowledgment and sequence numbers and forwards the RESP ACK segment to server S, as shown by flow 612C.

The connection between client C1 and interface unit 202 is then closed, as shown by flows 614A, B, C, D. It is important to note, however, that interface unit 202 maintains the connection with server S.

FIG. 6B continues the example of FIG. 6A. The flows of FIG. 6B correspond to flows 516 through 526 of FIG. 5. Flows 616A, B, C correspond to flow 516, and present one method of opening the connection between client C2 and interface unit 202. In TCP segment 618A, the SYN flag in the TCP header is set, indicating a new connection request from client C2. Client C2 has established a starting sequence number of 999 and an acknowledgment number of 999. Interface unit 202 responds with a SYN ACK segment specifying a starting sequence number of 4999, and incrementing the acknowledgment number to 1000. Client C2 responds with an ACK segment specifying a sequence number of 1000 and incrementing the acknowledgment number to 5000, as shown by flow 616C. Client C2 then sends a GET segment specifying a length of 50 bytes, as shown by flow 618.

Interface unit 202 determines that a free open connection exists with server S, and so it uses that connection. It is not necessary to open a new connection with server S. Because it is using a previously-opened connection with server S, interface unit 202 translates the sequence and acknowledgment numbers of the GET segment according to the sequence and acknowledgment numbers established during the prior exchange on that connection. In the present example, interface unit 202 uses the starting sequence and acknowledgment numbers established in flows 606, and resumes with the sequence and acknowledgment numbers using in the most recent flow, flow 612C. Thus interface unit 202 forwards the GET segment from client C2 to server S with a sequence number of 2000, an acknowledgment number of 7000, and a length of 50, as shown by flow line 620.

Server S responds with the requested data, specifying a sequence number of 7000, an acknowledgment number of 2050, and a length of 500, as shown by flow 622. Interface unit 202 receives the RESP segment, translates the sequence and acknowledgment numbers, and forwards the RESP segment to client C2, as shown by flow line 624A. Client C2 responds with a RESP ACK segment, as shown by flow 624B. Interface unit 202 modifies the acknowledgment and sequence numbers and forwards the RESP ACK segment to server S, as shown by flow 624C.

The connection between client C2 and interface unit 202 is then closed, as shown by flows 626A, B, C, D. It is important to note that interface unit 202 again maintains the connection with server S.

Figure 7:
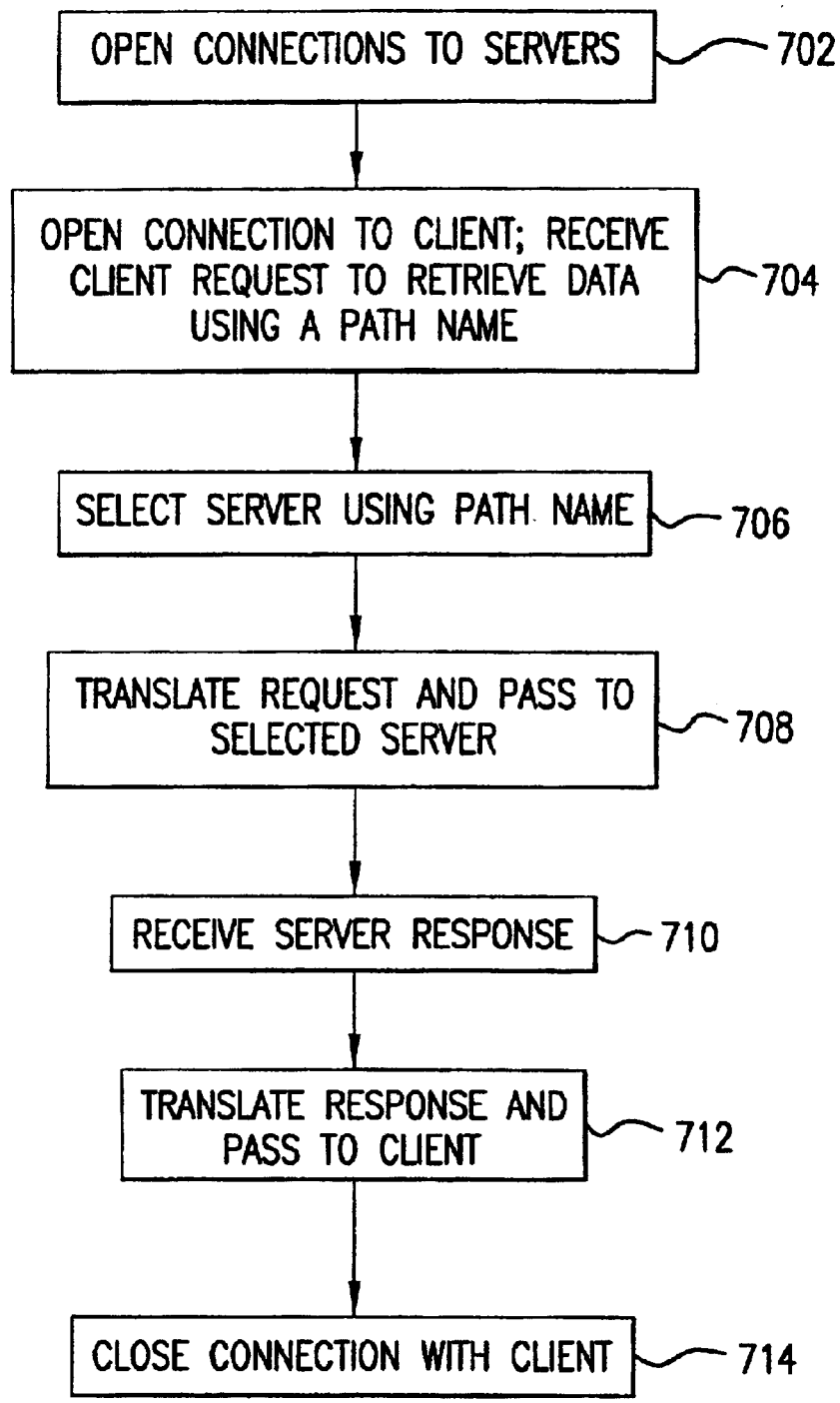
FIG. 7 is a flowchart depicting the operation of the connection distribution feature of the present invention according to a preferred embodiment.

FIG. 7 is a flowchart depicting the operation of the connection distribution feature of the present invention according to a preferred embodiment. According to this feature, interface unit 202 maintains connections with a plurality of servers, and routes client requests to these servers based on the path name specified in the client request. First, interface unit 202 opens connections with the servers, as shown in step 702. Next, in response to a client request, interface unit 202 opens a connection to the client and receives a request from the client to retrieve data using a path name, as shown in step 704. Interface unit 202 selects the server hosting the content specified by the path name, as shown in step 706. In alternative embodiments, interface unit 202 consults other predefined policies to select the appropriate server, such as the load of the servers and the state of the servers. Interface unit 202 manages and maintains a database of servers and server farms that it tends. Among other things, information in this database includes currently active policies and rules that allow interface unit 202 to direct incoming packets to the correct server. Depending on network conditions and services desired, these policies and rules can change very quickly.

Interface unit 202 then translates the request and passes the translated request to the selected server, as shown in Step 708. This translation is described generally with respect to FIG. 4 above, and in detail below.

The interface unit receives the response from the server, as shown in step 710. Interface unit 202 then translates the response and passes the translated response on to the client, as shown in step 712. As with step 708, the translation of strep 712 is described in detail below. Finally, interface unit 202 closes the connection with the client, as shown in step 714.

Figure 8:
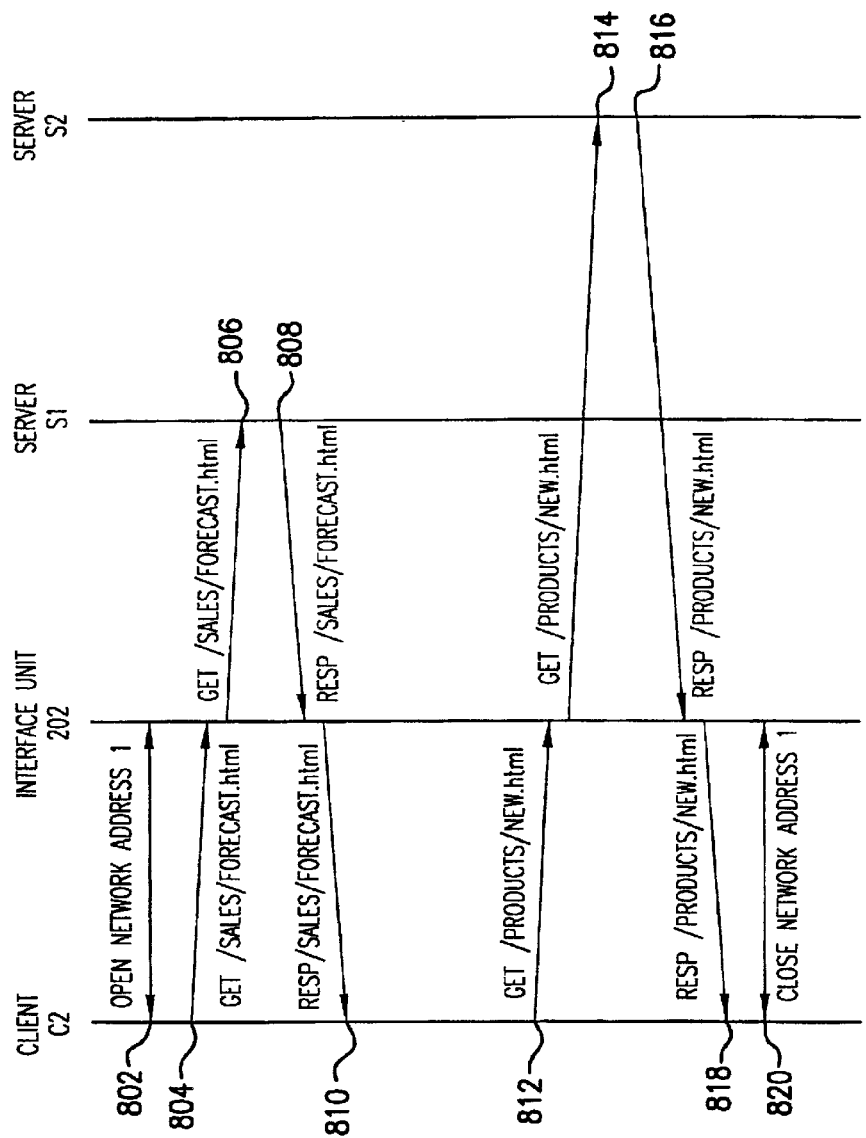
FIG. 8 is a message flow diagram illustrating the connection distribution aspect of the present invention according to a preferred embodiment.

FIG. 8 is a message flow diagram illustrating the connection distribution aspect of the present invention according to a preferred embodiment. FIG. 8 shows interface unit 202 connecting clients C2 to two servers S1 and S2. For this example, it is assumed that connections have previously been opened with servers S1 and S2, as shown in step 702 of FIG. 7.

First, interface unit 202 opens a connection with client C2 using network address 1 provided by client C2, as shown by flow 802. Once the connection is opened, interface unit 202 receives a GET request from client C1 specifying a path name of /sales/forecast.html, as shown by flow line 804. Because a free connection is open between interface unit 202 and server S1, interface unit 202 does not open a further connection with server S1.

Interface unit 202 maps the GET request to server S2 using the path name. For example, interface unit 202 can include a table that maps each path name in the server farm to the servers that contains the corresponding web page. Interface unit 202 forwards the GET request to server S1, as shown by flow line 806. Server S1 responds with the requested web page, as shown by flow line 808. Interface unit 202 forwards the web page to client C2, as shown by flow line 810. According to the connection pooling feature of the present invention, interface unit 202 does not close the connection with server S1, but rather keeps it open to accommodate further data flows.

Next, a further GET request is received from client C2, as shown by flow 812. It is unimportant to this example whether the connection between interface unit 202 and client C2 is closed between successive GET requests. It is also unimportant to this example whether this GET request originates from the same client as the previous GET request. What is significant is that, although the GET request from the client is directed to the same network address (network address 1) as the previous GET request, it is mapped to a different server (server S2) than the previous request. Due to the connection multiplexing feature of the present invention, this redirection is transparent to the originator of the request.

Interface unit 202 receives the GET request from client C2. The GET request specifies a path name of /products/new.html. Interface unit 202 determines that the web page corresponding to this path name resides upon server S2. Thus, although the GET requests in FIG. 8 specify the same network address, they are mapped, using their path names, to different servers. This example illustrates the "connection distribution" aspect of the present invention.

Because a free connection is already open between interface unit 202 and server S2, it is unnecessary for interface unit 202 to burden server S2 with the processing load of opening a further connection. Interface unit 202 merely uses a free open connection. Interface unit 202 receives the response from server S2, as shown by flow line 816, and forwards it to client C2, as shown by flow line 818. Finally, interface unit 202 closes the connection with client C2, as shown by flow 820. Once again, interface unit 202 does not close the connection with server S2. Instead, interface unit 202 keeps the connection open to accommodate further data flows.

Figure 9:
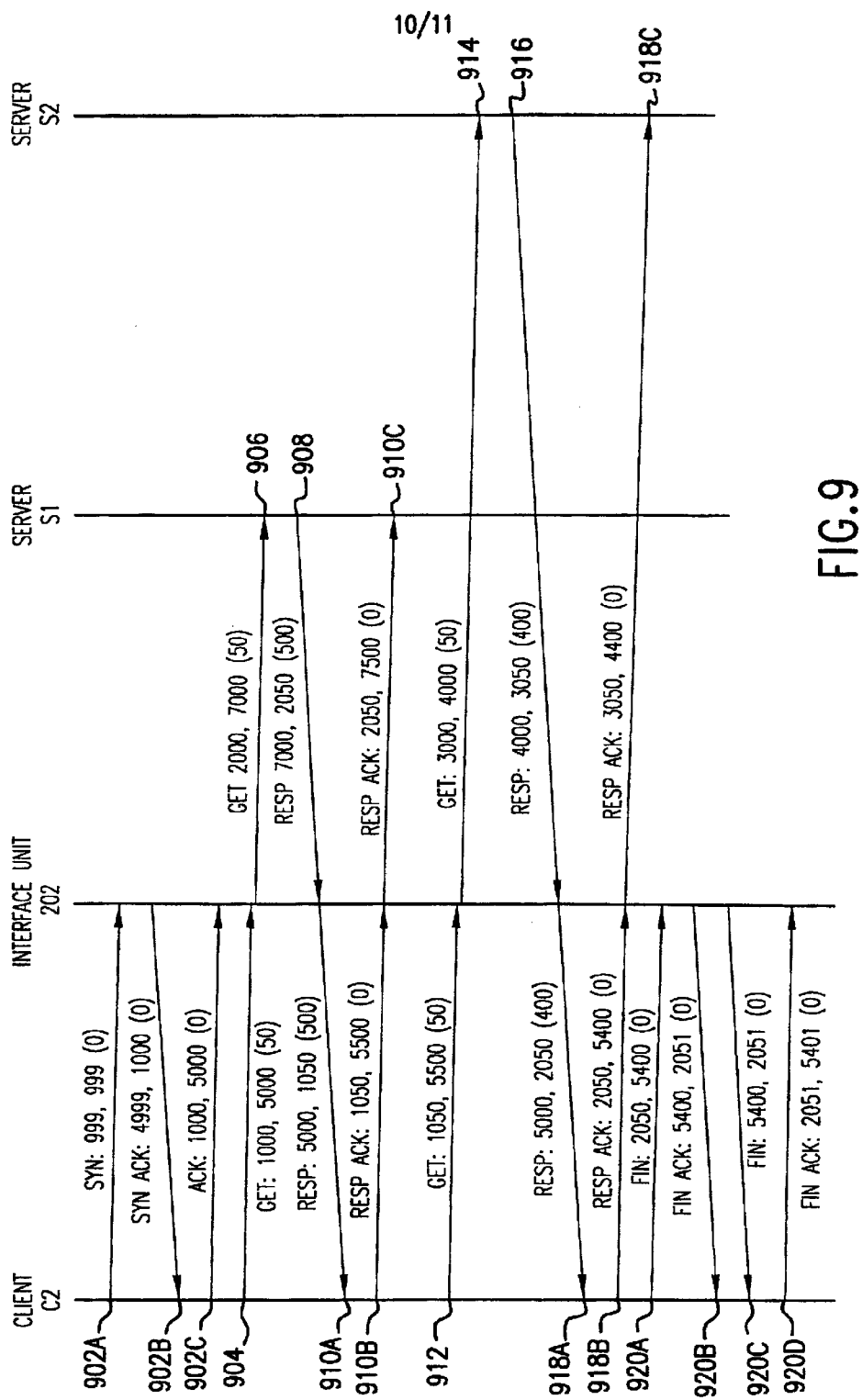
FIG. 9 is a detailed flow diagram illustrating the translations of acknowledgment and sequence numbers performed by the present invention in the example of FIG. 8 according to a preferred embodiment.

FIG. 9 is a detailed flow diagram illustrating the translations of acknowledgment and sequence numbers performed by the present invention in the example of FIG. 8 according to a preferred embodiment. The flows of FIG. 9 correspond to flows 802 through 820 of FIG. 8.

Flows 902A, B, C correspond to flow 802, and present one method of opening the connection between client C2 and interface unit 202. Client C2 has established a starting sequence number of 999 and an acknowledgment number of 999. Interface unit 202 responds with a SYN ACK segment specifying a starting sequence number of 4999, and incrementing the acknowledgment number to 1000, as shown by flow 902B. Client C2 responds with an ACK segment specifying a sequence number of 1000 and incrementing the acknowledgment number to 5000, as shown by flow 902C.

Client C2 then sends a GET segment specifying a length of 50 bytes, as shown by flow 904.

Because a free open connection exists with server S1, interface unit 202 uses that connection, rather than opening a new connection, and modifies the sequence and acknowledgment numbers in the GET segment using the sequence and acknowledgment numbers from the previous segment transmitted over that connection. In this example, assume that those parameters are 2000 and 7000, respectively. Accordingly, interface unit 202 forwards the GET segment to server S1 using sequence number 2000, acknowledgment number 7000, and length 50, as shown by flow line 906.

Server S1 responds with the requested data specifying a sequence number of 7000, an acknowledgment number of 2050, and a length of 500, as shown by flow 908. Interface unit 202 receives the RESP segment, translates the sequence and acknowledgment numbers, and forwards the RESP segment to client C2, as shown by flow line 910A. Client C2 responds with a RESP ACK segment, as shown by flow 910B. Interface unit 202 modifies the acknowledgment and sequence numbers and forwards the RESP ACK segment to server S1, as shown by flow 910C.

Interface unit 202 then receives a further GET segment from client C2, specifying a length of 50 bytes. As described above, interface unit 202 maps this request to server S2. Because a free connection is already open with that server, interface unit 202 uses that connection, and translates the sequence and acknowledgment parameters of the GET segment using the parameters from the previous segment transmitted over that connection. In this example, assume that those parameters are 3000 and 4000, respectively. Accordingly, interface unit 202 forwards the GET segment to server S2 using sequence number 3000, acknowledgment number 4000, and length 50, as shown by flow line 914.

Server S2 responds with the requested data specifying a sequence number of 4000, an acknowledgment number of 3050, and a length of 400, as shown by flow 916. Interface unit 202 receives the RESP segment, translates the sequence and acknowledgment numbers, and forwards the RESP segment to client C2, as shown by flow line 918A. Client C2 responds with a RESP ACK segment, as shown by flow 918B. Interface unit 202 modifies the acknowledgment and sequence numbers and forwards the RESP ACK segment to server S2, as shown by flow 918C. Finally, the connection between interface unit 202 and client C2 is closed, as shown in flows 920A, B, C, D.

Figure 10:
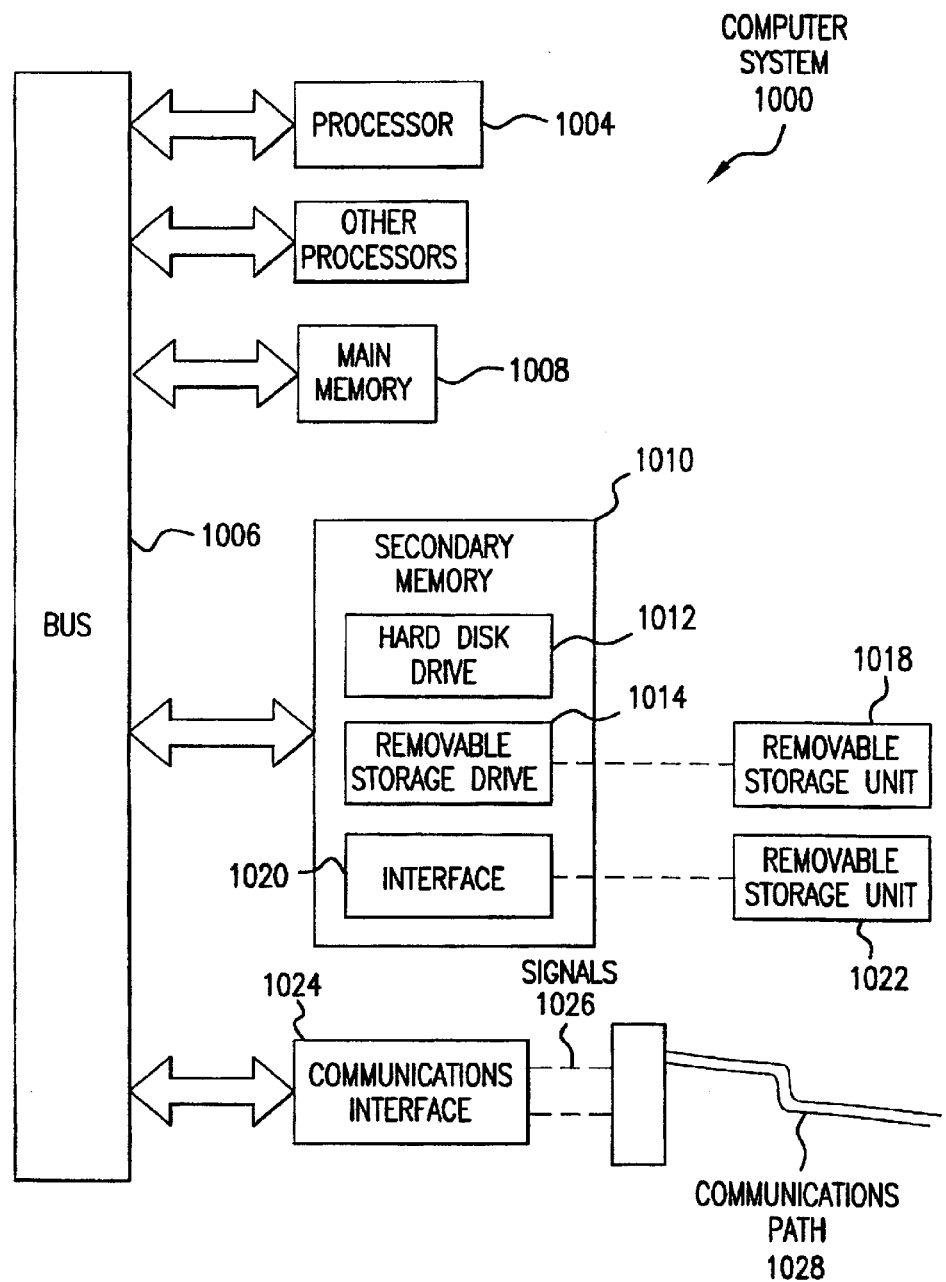
FIG. 10 depicts an example computer system in which the present invention can be implemented.

The present invention may be implemented using hardware, software or a combination thereof and may be implemented in a computer system or other processing system. In fact, in one embodiment, the invention is directed toward one or more computer systems capable of carrying out the functionality described herein. An example computer system 1000 is shown in FIG. 10. The computer system 1000 includes one or more processors, such as processor 1004. The processor 1004 is connected to a communication bus 1006. Various software embodiments are described in terms of this example computer system. After reading this description, it will become apparent to a person skilled in the relevant art how to implement the invention using other computer systems and/or computer architectures.

Computer system 1000 also includes a main memory 1008, preferably random access memory (RAM), and can also include a secondary memory 1010. The secondary memory 1010 can include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well known manner. Removable storage unit 1018, represents a floppy disk, magnetic tape, optical disk, etc. which is read by and written to by removable storage drive 1014. As will be appreciated, the removable storage unit 1018 includes a computer usable storage medium having stored therein computer software and/or data.

In alternative embodiments, secondary memory 1010 may include other similar means for allowing computer programs or other instructions to be loaded into computer system 1000. Such means can include, for example, a removable storage unit 1022 and an interface 1020. Examples of such can include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1018 to computer system 1000.

Computer system 1000 can also include a communications interface 1024. Communications interface 1024 allows software and data to be transferred between computer system 1000 and external devices. Examples of communications interface 1024 can include a modem, a network interface (such as an Ethernet card), a communications port, a PCMCIA slot and card, etc. Software and data transferred via communications interface 1024 are in the form of signals which can be electronic, electromagnetic, optical or other signals capable of being received by communications interface 1024. These signals 1026 are provided to communications interface via a channel 1028. This channel 1028 carries signals 1026 and can be implemented using wire or cable, fiber optics, a phone line, a cellular phone link, an RF link and other communications channels.

In this document, the terms "computer program medium" and "computer usable medium" are used to generally refer to media such as removable storage device 1018, a hard disk installed in hard disk drive 1012, and signals 1026. These computer program products are means for providing software to computer system 1000.

Computer programs (also called computer control logic) are stored in main memory and/or secondary memory 1010. Computer programs can also be received via communications interface 1024. Such computer programs, when executed, enable the computer system 1000 to perform the features of the present invention as discussed herein. In particular, the computer programs, when executed, enable the processor 1004 to perform the features of the present invention. Accordingly, such computer programs represent controllers of the computer system 1000.

In an embodiment where the invention is implemented using software, the software may be stored in a computer program product and loaded into computer system 1000 using removable storage drive 1014, hard drive 1012 or communications interface 1024. The control logic (software), when executed by the processor 1004, causes the processor 1004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

The present invention is described specifically when implemented within an interface unit, such as interface unit 202, that is connected to servers in a farm for the purpose of offloading connection processing overhead from the servers. However, the present invention can also be applied within other kinds of devices that are in the network connection path between the client and the servers. As network traffic flows through such devices, they all have the opportunity to apply the present invention to offload connection processing. Some examples of such devices are:

Load Balancers which distribute client network connections between a set of servers in a server farm (local or geographically distributed). The invention can readily be combined with the load balancing function.

Bandwidth managers which monitor network traffic and meter packet flow. These devices can also use the present invention.

Firewalls monitor packets and allow only the authorized packets to flow through. The present invention can be used to provide an additional feature within firewalls.

Routers and switches also lie in the path of the network traffic. The industry trend is to integrate additional functionality (such as load balancing, bandwidth management and firewall functionality) within these devices. Hence, the present invention can easily be incorporated into a router.

The specific integration of the present invention into each one of the above devices is implementation specific.

The present invention can also be applied within computer systems which are the end points of network connections. In this case, add-on cards can be used to implement the invention and thus offload the main processing elements within the computer system.

Conclusion

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method comprising the steps of:

opening a connection to a server in response to a request from a first client and establishing sequence and acknowledgment numbers used to transfer data over said connection;

receiving from a second client a request to retrieve data using a network address and a path name, wherein the request from the second client includes sequence and acknowledgment parameters;

requesting said data from said server using said connection by modifying said sequence and acknowledgment parameters based on said established sequence and acknowledgment numbers used for said connection;

receiving data from said server;

modifying sequence and acknowledgment parameters in said data received from said server to produce modified sequence and acknowledgment parameters; and sending said data to said second client with said modified sequence and acknowledgment parameters.

2. An apparatus comprising:

at least one of: (a) means for selecting a server storing data as a function of predefined policies based on a path name, (b) means for selecting said server storing said data as a function of predetermined policies based on a load of said server, and (c) means for selecting said server storing said data as a function of predefined policies based on the state of said server;

means for identifying a previously-opened connection to said server established in response to a request from a first client, and identifying sequence and acknowledgment numbers to be used in said connection;

means for receiving from a second client a request to retrieve data using a network address and a path name, wherein the request from the second client includes a GET segment having sequence and acknowledgment parameters;

means for requesting said data from said server using said previously-opened connection by modifying said sequence and acknowledgment parameters in said GET segment to produce a modified GET segment based on said information identifying sequence and acknowledgment numbers already used, and sending said modified GET segment to said server;

means for receiving said data from said server; and means for sending said data to said second client.

3. The apparatus of claim 2, wherein said means for sending said data to said second client comprises means for modifying sequence and acknowledgment parameters in said data upon receipt from said server to produce modified sequence and acknowledgment parameters, and sending said data to said second client with said modified sequence and acknowledgment parameters.

4. The apparatus of claim 2, wherein said information identifying sequence and acknowledgment numbers to be used in said connection comprise a starting sequence number and a starting acknowledge number respectively.

5. The apparatus of claim 2, wherein said means for receiving comprises:

means for receiving from said second client a request to open a connection to a host using said network address; and means for receiving from said second client a request to retrieve data using said path name.

6. The apparatus of claim 2, further comprising:

means for receiving a further request to retrieve further data using said network address and a further path name;

means for selecting a further server as a function of said further path name; and means for retrieving said further data from said further server.

7. The apparatus of claim 2, wherein said means for requesting said data from said server further comprises:

means for inserting a "Connection: Keep-Alive" header into said modified GET segment;

means for subtracting from said acknowledgement parameters received from said server the number of bytes added by inserting said "Connection:

Keep-Alive" header into said modified GET segment; and means for adding to said sequence number, prior to sending a packet to said server subsequent to said modified GET segment, the number of bytes added by inserting said "Connection: Keep Alive" header into said modified GET segment.

8. The apparatus of claim 2, wherein said means for requesting said data from said server further comprises:

means for receiving a first RESP segment having further sequence and acknowledgment parameters;

means for modifying said further parameters to produce a modified RESP segment; and means for sending said modified RESP segment to said client.

9. A method comprising the steps of:

opening a connection to a server in response to a request from a first client, said server selected as a function of predefined policies including at least one of a path name, a load of said server, and a state of said server;

identifying connection and sequence and acknowledgment numbers used in receiving data on said connection;

receiving from a second client a request to retrieve data, wherein the request from the second client includes sequence and acknowledgment parameters;

requesting said data from said server using said connection by modifying said sequence and acknowledgment parameters using said information identifying sequence and acknowledgment numbers used in said connection;

receiving data from said server; and sending said data to said second client.

10. The method of claim 9, wherein said receiving step comprises the steps of:

receiving from said second client a request to open a connection to a host using a network address; and receiving from said second client a request to retrieve data using a path name.

11. The method of claim 10, further comprising the steps of:

receiving a further request to retrieve further data using said network address and a further path name;

selecting a further server as a function of said further path name; and retrieving said further data from said further server.

12. The method of claim 9, wherein:

said step of receiving a request to retrieve data comprises the step of receiving a first GET segment having sequence and acknowledgment parameters; and said requesting step comprises the steps of
modifying said parameters to produce a modified GET segment, and
sending said modified GET segment to said server.

13. The method of claim 12, wherein said step of requesting said data from said server further comprises the steps of:

inserting a "Connection: Keep-Alive" header into said modified GET segment;

subtracting from said acknowledgement parameters received from said server the number of bytes added by inserting said "Connection: Keep-Alive" header into said modified GET segment; and adding to said sequence number, prior to sending a packet to said server subsequent to said modified GET segment, the number of bytes added by inserting said "Connection: Keep Alive" header into said modified GET segment.

14. The method of claim 12, further comprising the steps of:

receiving a first RESP segment having further sequence and acknowledgment parameters;

modifying said further parameters to produce a modified RESP segment; and sending said modified RESP segment to said second client.

15. The method of claim 11 further comprising the steps of:

receiving a first RESP segment having further sequence and acknowledgment parameters;

modifying said further parameters to produce further modified parameters; and sending a second RESP segment to said second client, said second RESP segment having said further modified parameters.

16. The method of claim 9, wherein:

said step of receiving a request to retrieve data comprises the step of receiving a first GET segment having sequence and acknowledgment parameters; and said retrieving step comprises the steps of
modifying said parameters to produce modified parameters, and
sending a second GET segment to said server, said second GET segment having said modified parameters.

17. The method of claim 9 wherein said sequence and acknowledgment numbers used in receiving data on said connection are a starting sequence number and a starting acknowledgment number respectively.

18. The method of claim 9 wherein said step of sending said data to said second client comprises modifying sequence and acknowledgment parameters in said data upon receipt from said server to produce modified sequence and acknowledgment parameters, and sending said data to said second client with said modified sequence and acknowledgment parameters.

* * * * *